United States Patent [19]

Tamura

[11] Patent Number: 4,653,104
[45] Date of Patent: Mar. 24, 1987

[54] OPTICAL THREE-DIMENSIONAL DIGITAL DATA ACQUISITION SYSTEM

[75] Inventor: Poohsan N. Tamura, Murrysville, Pa.

[73] Assignee: Westinghouse Electric Corp., Pittsburgh, Pa.

[21] Appl. No.: 653,987

[22] Filed: Sep. 24, 1984

[51] Int. Cl.$^4$ ............................................. G01B 11/24
[52] U.S. Cl. ......................................... 382/1; 382/42; 356/376
[58] Field of Search .................. 382/1, 42; 356/1, 376

[56] References Cited

U.S. PATENT DOCUMENTS

| 4,259,017 | 3/1981 | Ross | 356/376 |
| 4,272,196 | 6/1981 | Indebetouw | 356/376 |
| 4,371,866 | 2/1983 | Smith | 356/376 |

OTHER PUBLICATIONS

"Surface Measurement by Space Encoded Projected Beam Systems", Posdamer et al., *Computer Graphics and Image Processing* 18, pp. 1–17, Academic Press, Inc., Mar. 1981.
"White Scanner 100A Users Manual", Technical Arts Corporation, Seattle, Wash.
"White Scanner 100A Preliminary", Technical Arts Corporation, Seattle, Wash.

*Primary Examiner*—Howard A. Birmiel
*Attorney, Agent, or Firm*—Daniel C. Abeles

[57] ABSTRACT

The range of objects from a television camera is obtained by projecting a series of patterns of uniquely coded stripes of light onto the objects at an oblique angle to the optical axis of the camera and capturing in the camera the coded light signals reflected by the objects. Through proper selection and scaling of a coordinate system and related coding of the light stripes, the range of the object is determined for each pixel by simply subtracting one coordinate of the pixel from the binary coded light signal reflected into the pixel.

13 Claims, 11 Drawing Figures

OPTICAL THREE-DIMENSIONAL DIGITAL DATA ACQUISITION SYSTEM

BACKGROUND OF THE INVENTION

1. Field of the Invention

This invention relates to a method and apparatus for determining the range of objects for use in fields such as robotic vision and is particularly useful in generating dense range maps at high speed without using any mechanical motion. It uses a projector to project a series of striped patterns of light onto the object and a television camera to capture the stripe covered scene. The decoding of the video frames to obtain the range map is accomplished in the 2's complement domain.

2. Description of the Prior Art

Vision plays an important role in automating various kinds of tasks in industry and in the military. Three-dimensional vision is an indispensable sensing capability in accomplishing the task of closing the feedback loop so that the system can adapt to the situation and execute the mission effectively under an unstructured environment. It would be very helpful to have three-dimensional capability as well as conventional two-dimensional imaging capability in order to provide more reliable information to the system controller. There are many application areas that could benefit in terms of productivity and force multiplying factors, such as inspection and inventory of three-dimensional parts, three-dimensional navigation for autonomous vehicles, surveillance, and inspection in nuclear plants. Many efforts have been made to obtain the range information mainly in two technical categories.

The first category is the so-called "2.X-D" or quasi three-dimensional, 3-D, technique where range measurement of all the resolvable picture elements in the field of view is avoided. Instead, the ordinary gray scale two-dimensional image is combined with a priori knowledge with the help of artificial intelligence to estimate the range profile. Alternatively, the two-dimensional image is combined with any of many degrees of sparse range measurements varying from a single average range measure to the measurement of selected points of interest. The fraction X indicates how closely the specific technique performs as faithfully as a three-dimensional system. The advantage of the technique in this category is the speed of data acquisition. The disadvantage is unavoidable ambiguity when it is used in the unstructured environment.

The second category of ranging techniques is the "3.0-D", so to speak, or pure three-dimensional technique where the range measurement is done for every pixel in the field of view. The approach generates a "dense range map" mainly by using active structured light illumination. Since this is a metrological measurement, it is not associated with any ambiguity due to the estimation which was unavoidable in the 2.X-D approaches. This category can be divided into three techniques. The first is a single beam scanning technique that uses a mechanical, beam steering device and performs the range measurement point by point by evaluating the time-of-flight or the phase of the coded return beam. It is a suitable method for a subject located at a distance because it uses the given light most efficiently on the specific point in the field of view and maximizes the signal-to-noise ratio. The shortcomings of this technique are the slow speed due to the time consumed in scanning and the necessity of using a mechanical component for scanning.

The second technique in the 3.0-D category of ranging methods utilizes the projection of a stripe instead of a point onto the object space with an obliquity angle THETA. A television camera looking at the same object captures the scene with a two-dimensional detector array. The straight stripe appears to be deformed in the captured video frame due to the obliquity angle of the projection, and the post data acquisition process translates the amount of deformation into the surface profile using simple trigonometry. This technique has a distinct advantage over the last-mentioned technique: the elimination of both the undesirable mechanical scanner and the sophisticated phase measurement requirement. It is especially suited to the situation such as the inspection of the parts flowing on the belt conveyor and as an optical welding seam follower. The drawback of this technique is still the slow speed. An entire frame time must be spent to evaluate the result of a single stripe. If the scene is to be covered by 256 stripes, it requires 7 seconds at least just to record the data, assuming an ordinary 30 msec framing time. Thus, it is too slow for many real-time recognition applications.

A third technique in the "3.0-D" ranging category utilizes the projection of a multistripe pattern. Since one pattern covers the entire field of view, a single video frame can be used to obtain the amount of deformation of all the stripes. It is, therefore, a highly efficient data acquisition technique. This is true, however, only when the deformed stripe appears as a continuous function. If there is any discontinuity in the surface profile, the stripes are not continuous at the boundary which creates a serious ambiguity. Thus, this technique is limited to the analysis of relatively smooth surfaces or restricted to the evaluation of the local slopes. It is not ideal for reliable object recognition in an unstructured environment.

The problem is how to solve the dilemma created by the second and the third techniques in the "3.0-D" category of ranging methods. If the speed is improved, the technique suffers from the ambiguity. If the ambiguity is eliminated, the technique suffers from slow speed.

It is the primary object of the present invention to provide a method and apparatus for generating dense range maps at high speed without using mechanical motion and without creating any ambiguities.

SUMMARY OF THE INVENTION

This and other objects are realized by projecting a series of patterns of stripes of light onto the objects at an oblique angle to the optical axis of a television camera placed in front of the objects so that projected light reflected by the objects is captured by the camera. The stripes of light are coded in binary form by making each one selectively dark and bright in a unique sequence in successive patterns. The entire object space is covered by the pattern of contiguous stripes with the number of stripes selected to provide the desired resolution. The number of patterns of stripes required to uniquely encode each individual stripe is equal to the $\log_2$ of the number of stripes.

The uniquely coded reflected light captured at each pixel in the television camera is an indication of the particular stripe which illuminated that object and therefore an indication of the location of the object. The X-Y coordinates of the object are readily obtained from the coordinates of the pixel receiving the reflected light signal. The Z axis coordinate is determined from the pixel X axis coordinate and the known position of the illuminating stripe of light.

While conventional trigonometric techniques can be used to determine the range of the object from the television camera using the pixel coordinate information and the known track of the coded light stripe, the present invention provides a particularly simple, rapid arrangement for determining the range. A three dimensional cartesian coordinate system is established in the object space with the X and Y axes parallel to the X-Y plane of the television camera and with the Z axis parallel to the camera optical axis. The stripes of light are projected through this coordinate system with the stripes parallel to the Y axis and intersecting the X and Z axes at an oblique angle. The scale on the X and Z axes is established by the width of the oblique intersection of the stripes with the respective axes. Additionally, the scale of the X axis of the pixel array in the camera is set by the scale on the X axis of the object space coordinate system.

With this coordinate system, the stripes are numbered and correspondingly coded sequentially from the origin. Thus, for example, the Dth stripe intersects the X axis and the Z axis D units from the origin on each of the respective scales. Since the Dth stripe is encoded with the binary representation of the number D, the distance of an object illuminated by the Dth stripe from the origin of the object space coordinate system can be simply determined by subtracting the X coordinate of the pixel receiving reflected Dth stripe light, from the coded signal received.

In a preferred form, the origin of the object space coordinate system is located in the vicinity of the center of the object space and the stripes are numbered in the positive and negative direction from a zero order stripe passing through the origin. A 2's compliment notation is used for compatibility with the typical programmable digital computer which is used to coordinate the projecton of the stripe patterns, data gathering and calculation of the ranges.

Where a relatively narrow depth of field is required compared to the X dimension of the object space, the stripe pattern may be repeated side by side as many times as required. The invention also encompasses adding an additional pattern of stripes to provide a parity bit which improves reliability by eliminating erroneous data generated by unexpected motion of an object or secondary reflections. By using an odd parity scheme, the blind spot which would be created by the zero order stripe passing through the origin is eliminated.

The present invention which embraces both method and apparatus for carrying out the above techniques, provides many unique advantages including, high reliability, high speed, digital compatibility, gray scale information, and high range resolution. These advantages are discussed more fully in the following description of the preferred embodiments.

BRIEF DESCRIPTION OF THE DRAWINGS

A full understanding of the invention can be gained from the following description of the specific embodiment taken in conjunction with the accompanying drawings in which.

DESCRIPTION OF THE PREFERRED EMBODIMENT

Figure 1:
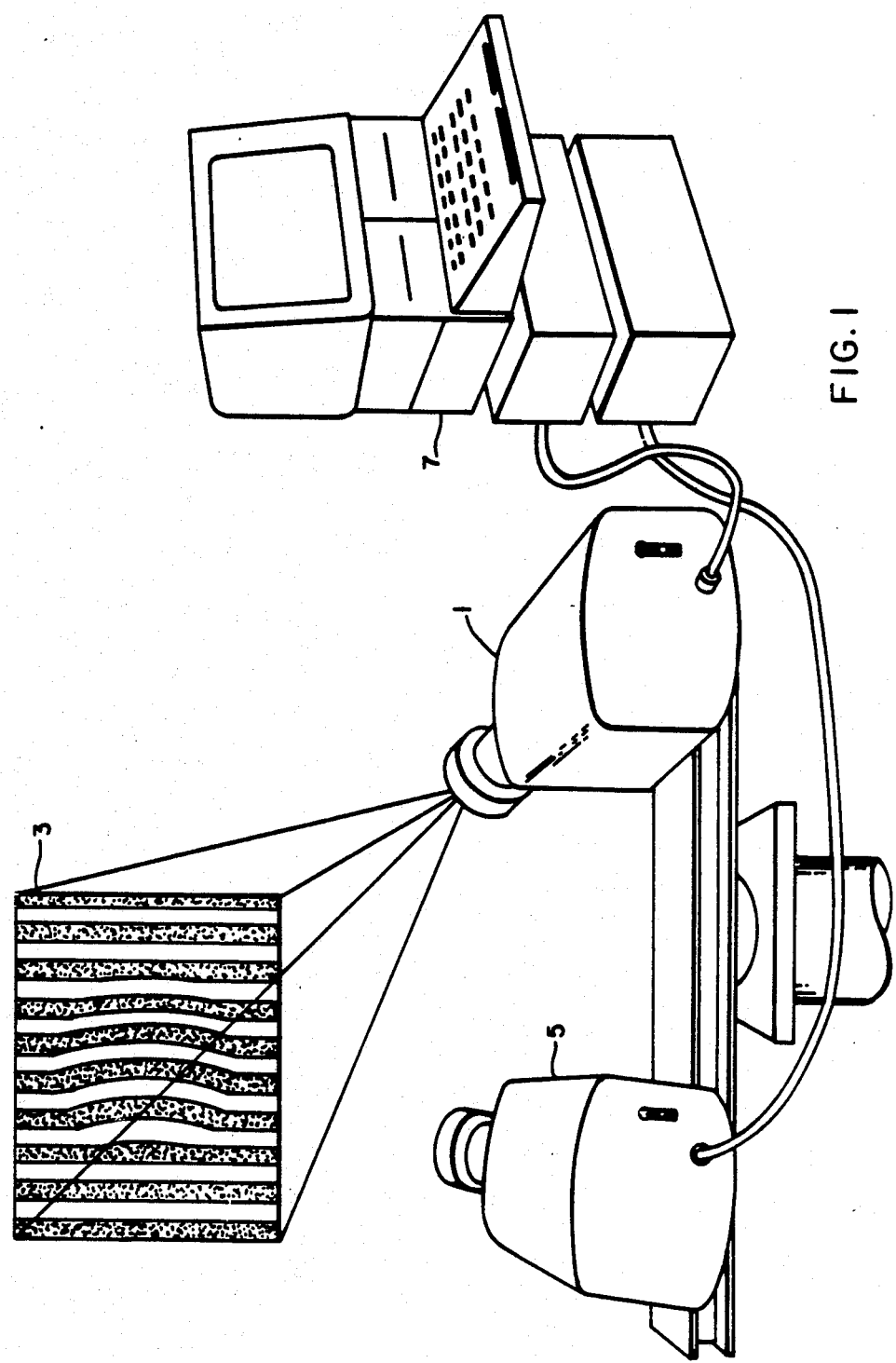
FIG. 1 is a perspective view of an arrangement of apparatus for practicing the invention.

FIG. 1 illustrates an arrangement of apparatus for practicing the invention which includes a projector 1 which projects a series of patterns of stripes of light on the space 3 containing objects, the location of which is to be determined, and a conventional television camera 5 which records the level of light reflected by objects in the object space for each pattern of light stripes. The camera 5 typically has hundreds of detectors arranged in an X-Y array. Each of the discrete points at which the light intensity can be measured by one of these detectors is referred to as a pixel. A general purpose digital computer 7 controls the generation of the coded patterns of light stripes by the projector 1, converts the shades of light intensity detected at each pixel in the television camera 5 into a binary signal having a ZERO value for an intensity below a given threshold and a ONE value for an intensity which exceeds the threshold, stores the binary signal generated at each pixel for each pattern of light stripes, and processes the stored signals to determine the distance of objects from the television camera 5.

Figure 2:
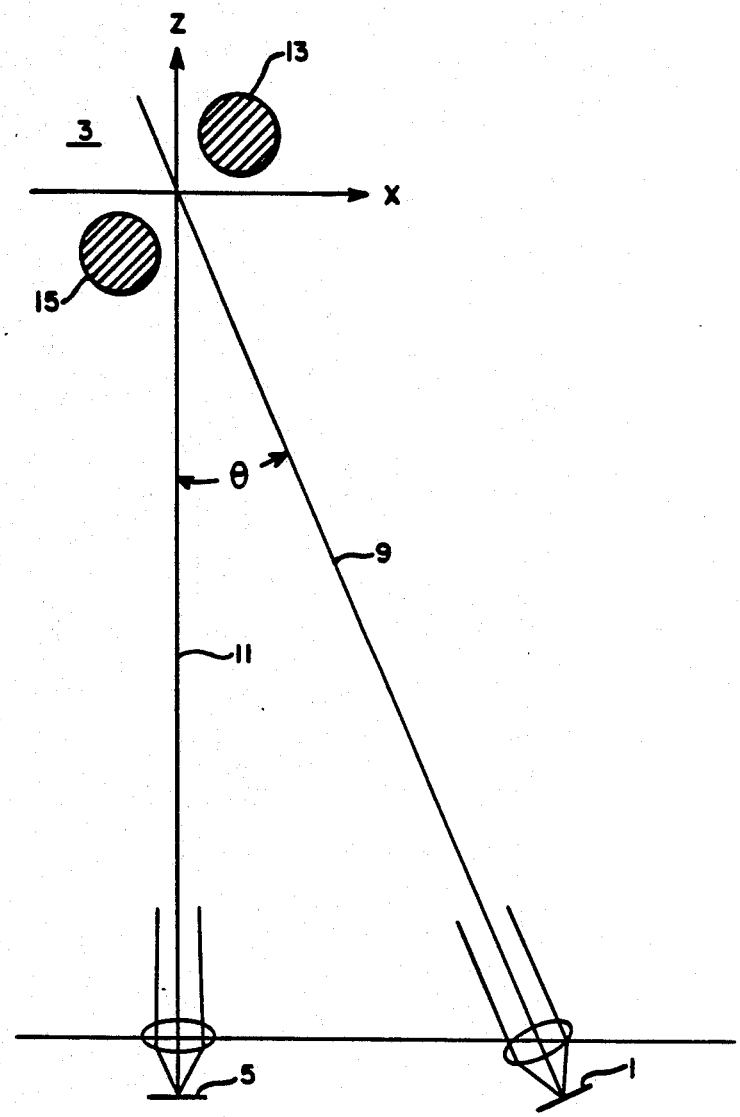
FIG. 2 is a diagrammatic plan view illustrating the geometric arrangement of the television camera and projector of FIG. 1 relative to objects to which the distance from the television camera is to be measured.

FIG. 2 illustrates that the projector 1 is arranged geometrically with respect to the camera 5 such that the axis of projection 9 of the projector forms an angle $\theta$ with the optical axis 11 of the camera. Due to surface scattering, some of the light from the projector 1 which strikes objects 13 and 15 is reflected at the angle $\theta$ and is detected by the television camera 5.

Figure 3:
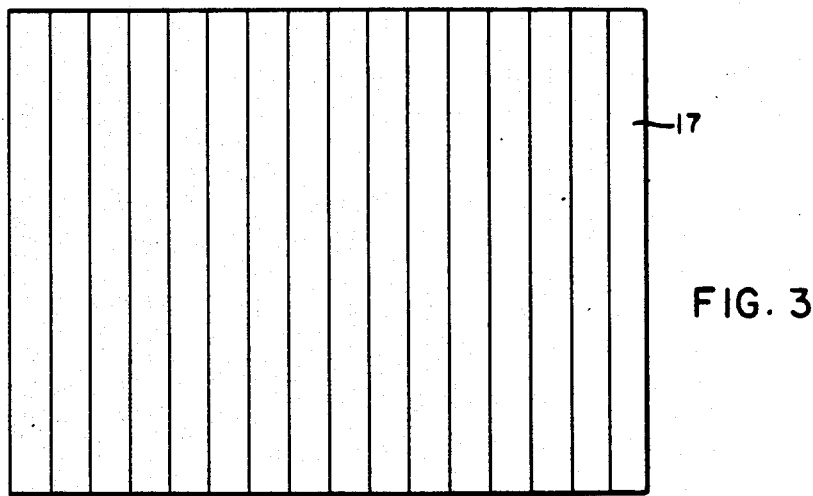
FIG. 3 is a diagram illustrating the system used to code the striped patterns of light generated by the projector.
Figure 4:
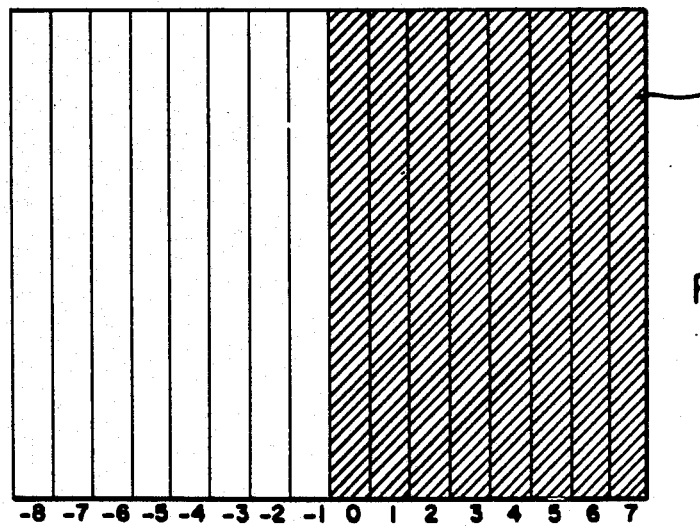
FIGS. 4 through 7 are illustrations of a series of coded striped patterns of light generated by the projector for an illustrative system dividing the patterns into 16 stripes.
Figure 5:
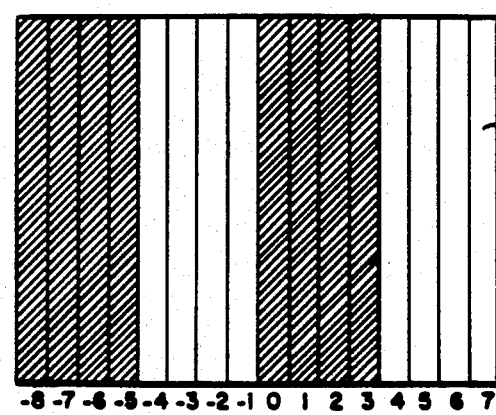
Figure 6:
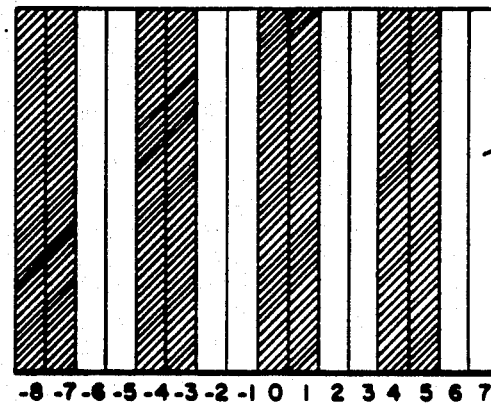
Figure 7:
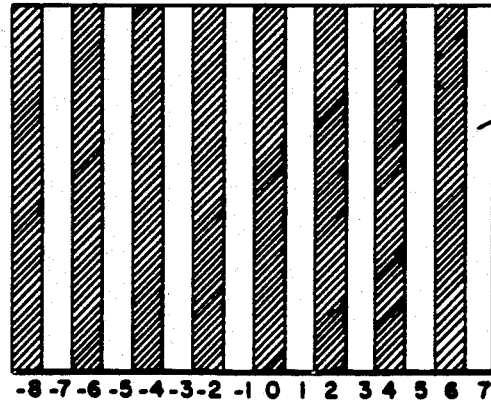

The projector 1 generates patterns of stripes 17 of light as illustrated in FIG. 3. The stripes 17 extend in a direction perpendicular to the plane formed by the axes 9 and 11. The individual stripes 17 are illuminated (bright) or not (dark) in a sequence of patterns generated by the projector 1. Each stripe 17 is coded by a unique number in binary form representative of the state, a ONE for bright and a ZERO for dark, of that stripe for each pattern in the sequence. By way of example, FIG. 3 illustrates division of the projected pattern into 16 contiguous, discrete, vertical stripes of equal width. In the typical system, the number of stripes would be much larger, but in any event would be selected to provide the desired resolution, which as will become more evident later in the discussion, is determined by the width of the stripes. Each of the stripes 17 is assigned a number beginning with −8 for the left stripe and increasing by one for each adjacent stripe up to the number +7. The 2's complement notation is utilized so that −8 is represented by 1000, −7 by 1001 up to 0111 for +7. Such an arrangement requires four bits for each number to uniquely identify the 16 stripes. The binary number assigned to each stripe is shown in FIG. 3 under the stripe reading vertically downward from the most significant bit (MSB) to the least significant bit (LSB).

In order to generate the four bits required to code each stripe, the projector 1 generates four different patterns of stripes which are illustrated in FIGS. 4 through 7. In the first pattern, shown in FIG. 4, which generates the stripes in conformity with the most significant bits (MSB) of each of the numbers representing the 16 stripes, all the stripes on the right side are dark (have a ZERO value) and all of the stripes on the left side are bright (have a value of ONE). This generates in effect, two composite stripes: one bright and one dark. In the second pattern, shown in FIG. 5, the spatial frequency of the four composite stripes is twice that in FIG. 4, but they are only one-half as wide. Similarly, in the third pattern shown in FIG. 6, the spatial frequency of the composite stripes is four times that for the most significant bit and the composite stripes have one-quarter the width. In the fourth pattern shown in FIG. 7, which represents the least significant bit, adjacent stripes are in opposite states so that the spatial frequency is eight times that for the most significant bit.

The reflections from the objects 13 and 15 created by the four stripe patterns of FIGS. 4 through 7 are captured by the camera in binary form (see FIG. 3). By knowing the history of reflected light received at each pixel in the television camera, the stripe order of each point can be determined. To put it another way, the binary number generated at each pixel indicates which stripe illuminated the object which is reflecting light onto that pixel. At this point, it is worth noting that there is no correlation required between the number of pixels in the television camera and the number of stripes but only that the stripes be at least as wide as a pixel.

Figure 8:
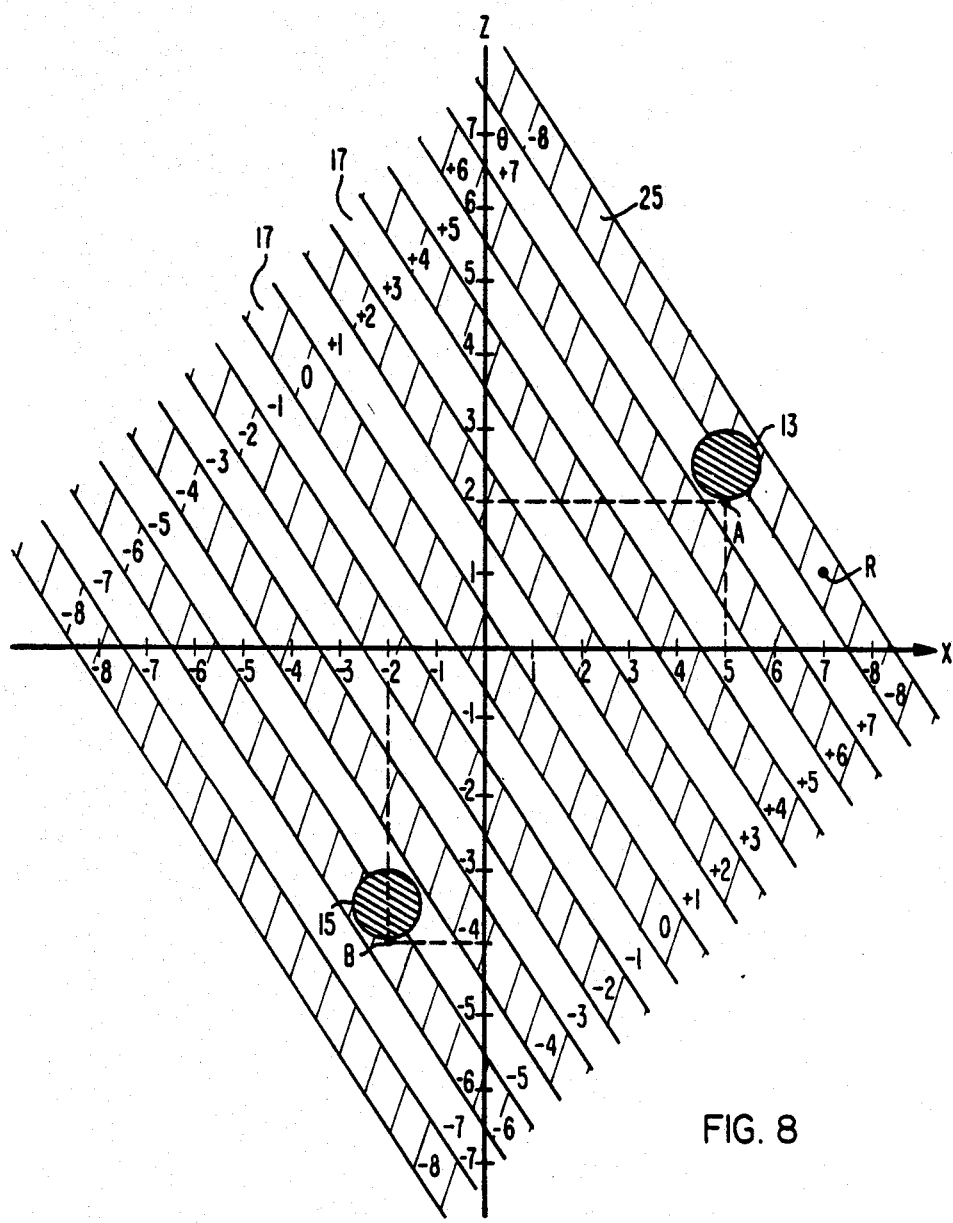
FIG. 8 is a diagram illustrating the projection of the least significant bit striped pattern onto the objects shown in FIG. 2 and showing the coordinate system used to determine the range.

The orientation of the projector 1 is adjusted to look at the center of the object space with the axis 9 of the projector intersecting the optical axis 11 of the camera at the obliquity angle $\theta$ at the origin of the X-Z coordinates (see FIG. 2). FIG. 8 shows the area around the objects 13 and 15 of FIG. 2 on an enlarged scale with the X-Z coordinates superimposed and with the least significant bit stripe pattern of FIG. 7 projected onto the scene. As can be seen from FIG. 8, the zero order stripe always penetrates the X-Z origin. Thus, if there is a light reflecting surface at the origin, it experiences the exposures: dark, dark, dark, dark. If the reflecting surface is one unit away from the origin along the Z axis (i.e. the range is longer), it will be illuminated by the one order stripe and will receive the exposure: dark, dark, dark, bright that is the unique sequence generated by the +1 stripe. As can be deduced immediately, there is a linear relationship between the stripe order and the range of the reflecting surface. The higher the stripe order, the longer the range of the scattering surface. Thus, for a scattering surface along the Z axis, the range can be read out directly in digital form as the binary number generated by the stripe which intersects the Z axis at the range of the reflecting surface.

Figure 9:
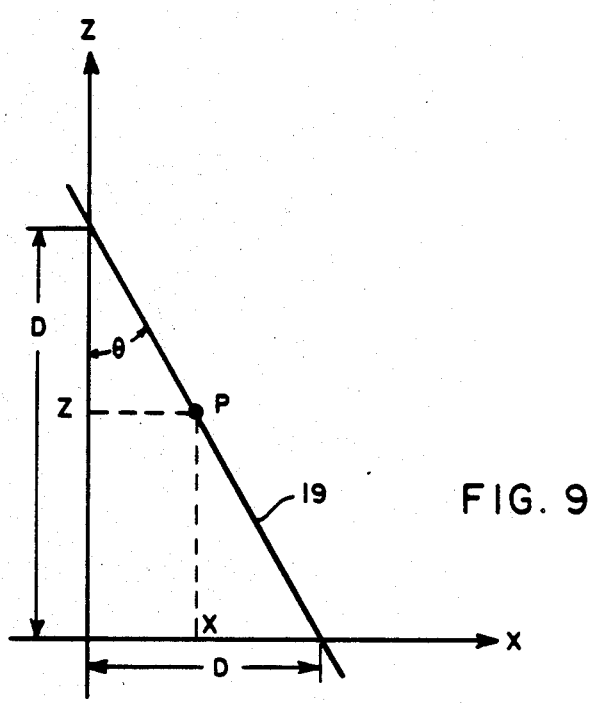
FIG. 9 is a diagram illustrating the method used to determine the range of an object from data generated by the coded stripe pattern.

I have devised a generalized but simple decoding method that can generate the range of reflecting surfaces at all points in the object space. Suppose there is an arbitrary scattering point P in the object space X-Y-Z. The function of the camera is to obtain the projection of the point P onto the X-Y coordinates. Therefore, it is easy to obtain the X and Y value by simply finding the horizontal address and the vertical address in the detector array for the pixel illuminated by light reflected from the scattering surface at point P. The only question remaining then is how to obtain the Z value using the address information and the reflected light history data. To accomplish this we can analyze the simple geometry in the X-Z plane to which the point P belongs as shown in FIG. 9. The history of reflected light for the camera pixel aligned with the point P tells us that it belongs to the stripe order D, from which we know that the point P exists somewhere along the optical ray trace 19 of the Dth order stripe.

From FIG. 9 it can be appreciated that the equation for the line 19, the Dth trace is:

$$Z = AX + D \tag{1}$$

where A is the slope of the line, and is negative and D is the X offset. Since the relative scales on the X and Z axes have been selected so that each stripe trace intersects each axis at the number of units corresponding to the order of the stripe, the interesection of the line 19 with Z axis occurs also at the distance D from the origin. (See FIG. 8 where the 5 order stripe intersects the X axis at X=5 and the Z axis at Z=5.) Hence, the slope A of line 19 is equal to −1. Substituting this into equation 1, we obtain:

$$Z = D - X \tag{2}$$

as the general expression for the Z coordinate of any point along the Dth order stripe 19. Regarding the point P, we already know the X coordinate for the pixel which receives reflected light from the point P, hence the relative range (from the coordinate system origin) is readily obtained by subtracting this X value from the coded signal which is received at that pixel.

Applying this technique to a practical problem, relative range of the points A and B on the objects 13 and 15 respectively in FIG. 8 will be determined. The X coordinate which would be known from the X coordinate of the pixel aligned with the point A is +5, or in binary form 0101. As seen from FIG. 8, the point A is illuminated by the +7 stripe. This would be determined by the exposure experience of the point A which is dark, bright, bright, bright, or in binary from 0111. Substituting these values into Equation (2) we find that:

Point $A$  $D = 0111$
  $\underline{X = 0101\ (-}$
  $Z = 0010 = 2_{10}$

In other words, the Z coordinate is 2 in base 10 notation. Thus, merely by subtracting the binary number representative of the X value of the pixel which receives reflected light from a point, directly from the coded signal received at that pixel, which is representative of the stripe that generated that coded signal, the relative range of the point is simply and rapidly determined.

Figure 10:
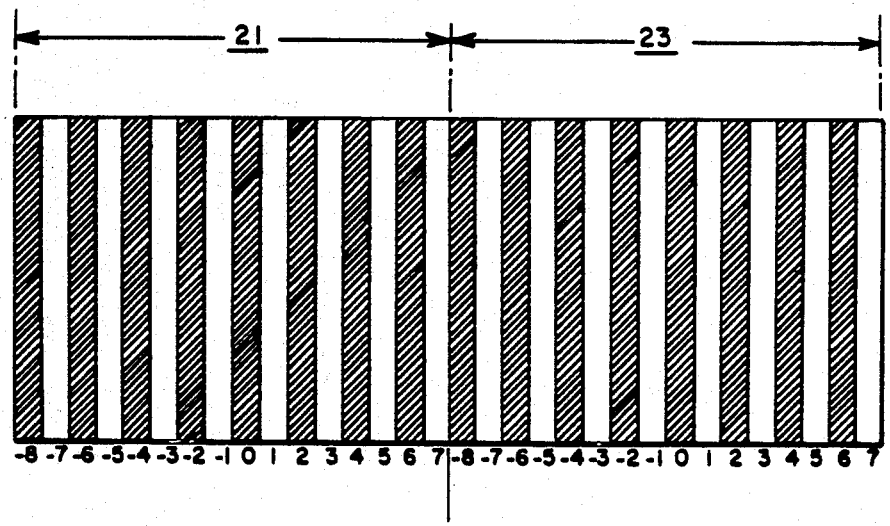
FIG. 10 is a diagram illustrating a technique of ranging according to the invention in which two sets of stripe patterns are projected side by side.

To illustrate that the technique also works with negative values, consider the point B where the X coordinate is −2, which is 2's complement notation is 1110, and where the point is illuminated by the −6 stripe which is coded as: bright, dark bright, dark and is represented by the binary number 1010. Substituting these values in Equation (2) we find that:

Point B  $D = 1010$
$X = 1110 \, (-$
$\overline{Z = 11000} = -4_{10}$ which indicates that the Z coordinate of point B is −4 in base 10 notation.

Where the object space to be covered is relatively shallow in the Z direction but broad in the X direction, the selected sequence of stripe patterns can be repeated in the X direction as many times as necessary. For instance if 16 units in the Z direction is sufficient to cover the depth of field required but 32 units are needed in the X direction, the 16 stripe patterns shown in FIGS. 4 through 7 can be repeated side by side as shown in FIG. 10 for the least significant bit pattern. The coding for the second set of patterns 23 is the same as that shown in FIG. 3 for the first set 21. This does not create any difficulty in decoding even at the interface between two patterns as can be demonstrated by the example of point R in FIG. 3 which is along the path of the −8 order stripe 25 in the second set of stripe patterns. Thus D equals −8 in 2's complement notation and X equals +7. Using Equation (2) it can be determined that:

Point R  $D = 1000$
$X = 0111 \, (-$
$\overline{Z = 0001} = 1_{10}$ which can be corroborated by graphical analysis of FIG. 8. Additional sets of stripe patterns can be added as necessary to provide the required coverage in the X direction. It should be noted that the scale in the Z axis is proportional to that in the X axis and that both are dependent upon the width of the stripes. The ratio of the scale of the Z axis to that in the X axis is dependent on the angle $\theta$. The larger the angle $\theta$ the greater then resolution along the Z axis.

Figure 11:
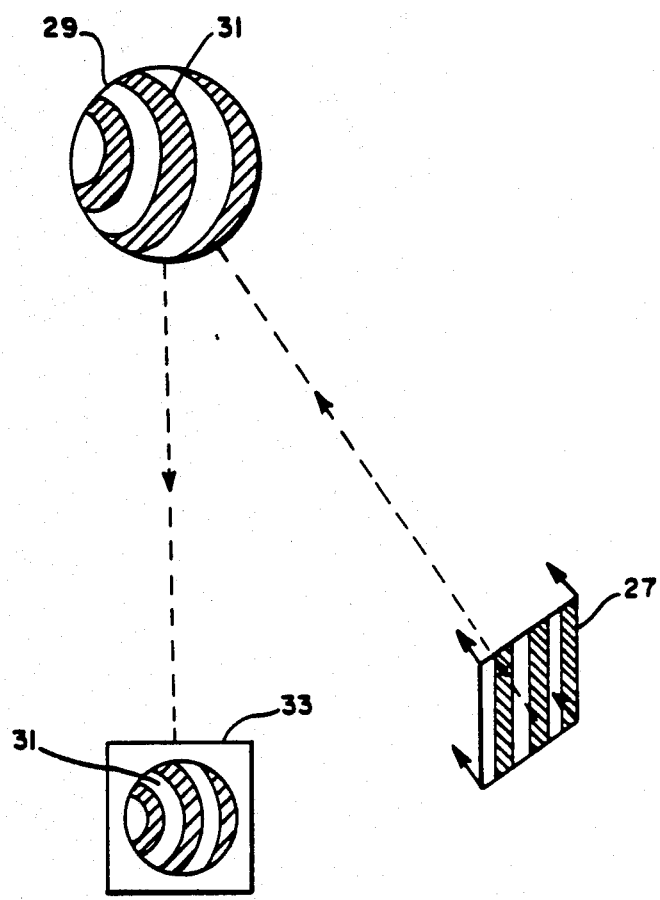
FIG. 11 is a diagram illustrating application of the invention to mapping the surface of a three dimensional object.

While to this point the invention has been discussed with respect to determining the range of discrete points in the object space, it has great value in mapping the surface of contoured objects. For instance if the stripe patterns 27 of the invention are projected onto a sphere 29 as illustrated in FIG. 11, the stripes 31 will appear curved as viewed in the focal plane 33 of the television camera. Since all of the pixels along a vertical line in the television camera focal plane 33 have the same X coordinate, the curvature of the stripes 31 to the left, above and below the vertical midpoint of the focal plane means that the pixels on any selected vertical line will be illuminated by a higher order stripe the farther from the vertical midpoint that they lay, which according to Equation (2), generates an increasing range measurement to indicate that the surface is curving away from the viewer. Using the present invention, a dense range map of the entire object space can be generated rapidly.

There are many advantages to the techniques of the invention. The first is high reliability resulting from the elimination of all mechanically moving components, the binary detection of the light level to relax the signal-to-noise ratio requirement, and the simple decoding method that does not involve any guessing or ambiguity. It is possible to provide a parity bit for the coded signals simply by adding one more exposure having the parity bit pattern shown in FIG. 3. The parity of the reflected light history of each pixel can be checked before the decoding process. In this manner, system reliability can be improved by eliminating the unreliable pixels that may be caused by the unexpected motion of the object or by the reception of an undesirable secondary reflection from a relatively specular surface characteristic. There is another benefit to be derived by selecting an odd parity test. The blind spot created by the coding or dark, dark, dark, dark for the zero order stripe is eliminated by the bright parity bit generated by an odd parity scheme.

The present invention generates full range information at high speed. It requires only $\log_2 M$ frames instead of M frames, where M is the number of resolvable range elements or literally the "dynamic range". For example, it requires only 8 frames (or about ¼ second using an ordinary video camera) where M equals 256 and the decoding process does not burden the throughput of the total system at all because of the extremely simple decoding method. The single stripe technique needs as many as 256 frames (more than 7 seconds) for this resolution. The reduction of the data acquisition time from a single stripe technique to the present technique is $(\log_2 M)/M$. Roughly, it is equivalent to the computation time reduction achieved when switching from the discrete Fourier Transformation to the Fast Fourier Transformation. This advantage increases as the dynamic range requirement increases.

The output from the optical three-dimensional digital data acquisition system of this invention is digital by nature. The 2's complement representation of the range will ease its interface with a variety of host computers or communication channels in many future applications.

Another advantage of the present invention is that since the system uses an ordinary video camera, the ordinary gray scale video signal is available. This allows utilization of both an analog gray scale and a digital range simultaneously. For example, it will be able to label all the points of interest with the X-Y coordinates information superposed on the same video frame to aid the human operator who is supervising the robot.

Yet another advantage of the present invention is that the range resolution $\Delta Z$ is only limited by the resolution of camera $\Delta X$. $\Delta Z = (1/\tan \theta) \Delta X$, where $\theta$ is the obliquity angle between the camera and the projector. Thus, it is scalable using a variety of lenses or by adding a zooming capability. It will be able to generate the dense range map of a telescopic object, microscopic object, or anything in between.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

I claim:

1. A method of determining the range of a plurality of points on objects arranged in three-dimensional object space using a projector and a television camera having a plurality of pixel locations at which light can be detected arranged in an array in an X-Y plane and an optical axis perpendicular to said X-Y plane, said method comprising the steps of:

establishing an X-Y-Z set of coordinates in the object space with the X and Y axes parallel to the corresponding axes in the pixel array of the television camera and with the Z axis extending parallel to the optical axis of the camera;

projecting a series of patterns of coded stripes of light which are parallel to the Y axis of the set of coordinates into the object space and onto the objects along an axis which intersects the X and Z axes at an oblique angle such that some of the light is reflected by the objects toward the television camera;

setting the scales on the X and Z axes of the set of coordinates as the width of the oblique intersection of the stripes with the respective axes, and setting the scale on the X axis of the pixel array as a function of the scale set on the X axis of the set of coordinates;

coding each of said stripes by selectively making the stripe dark and bright in said series of patterns in a unique sequence representative of a binary number, and with the stripes coded in consecutive numerical order across the pattern from the origin of the X-Y-Z set of coordinates; and calculating the distance in the direction of the Z axis of the point reflecting light toward each pixel by subtracting the X coordinate of the pixel from the coded light signal detected at that pixel location.

2. The method of claim 1 wherein the pattern of stripes is spatially repeated side-by-side.

3. The method of claim 1 wherein the origin of the X-Y-Z set of coordinates is positioned approximately in the center of the object space and wherein the stripes are coded in positive numerical sequence proceeding in one direction from the origin and in a negative sequence in the opposite direction along the X axis with the stripe passing through the origin coded as the numeral zero.

4. The method of claim 3 wherein the pattern of stripes of light is spatially repeated side-by-side with the corresponding stripes in each repetition coded the same.

5. The method of claim 3 including the steps of projecting an additional pattern of said stripes coded to generate a selected parity bit for each stripe, calculating the parity value of the coded light signal detected at each pixel and eliminating the distance calculated for the coded light signal detected at any pixel which does not have the selected parity value.

6. The method of claim 3 wherein said stripes which are coded as negative numbers are coded in 2's complement notation.

7. The method of claim 6 including the steps of projecting an additional pattern of said stripes coded to provide an odd parity bit for each stripe, calculating for each pixel location the parity value for each coded light signal detected and eliminating the distances calculated for any pixel for which the coded light signal detected does not have an odd parity value.

8. Apparatus for determining the location in the Z direction of points on objects in an X-Y-Z coordinate system, comprising:

a television camera having a plurality of light receiving pixels arranged in an X-Y array parallel to the X-Y plane of the coordinate system and with the optical axis of the television camera parallel to the Z axis, said television camera having means for generating X coordinate signals in binary form for each pixel location;

a projector for projecting a series of uniquely coded patterns of stripes of light onto said objects along an axis which intersects the optical axis of the television camera at an oblique angle such that some coded light is reflected by the objects toward said television camera, the scales on the X and Z axes of the coordinate system being set by the width of the oblique intersection of the stripes with the respective axes and with the scale of the X axis of the pixel array being set by the scale on the X axis of the coordinate system;

means for uniquely coding each stripe by selectively making the stripe dark and bright in said series of patterns in a unique sequence representative of a binary number, and with the stripes coded in consecutive numerical order across the pattern; and means for calculating the Z location of the points on said objects by subtracting for each pixel in the television camera the X coordinate signal from the coded reflected light signal received by that pixel.

9. The apparatus of claim 8 wherein said projector includes means for spatially repeating said series of patterns of stripes of light side-by-side and wherein said coding means includes means for coding corresponding stripes in each repetition with the same code.

10. The apparatus of claim 8 wherein the optical axis of the television camera is aligned so as to be coextensive with the Z axis of the coordinate system, wherein the projector projects said patterns of stripes such that they cross the X axis of the coordinate system with some stripes on one side of the origin, others on the other side of the origin and one stripe passing through the origin, and wherein said coding means codes said some stripes as consecutive positive binary numbers, said other stripes as consecutive negative binary numbers and the stripe passing through the origin as zero.

11. The apparatus of claim 10 wherein said coding means codes said other stripes as negative binary numbers using 2's complement notation.

12. The apparatus of claim 11 wherein said projector projects an additional pattern of stripes of light, wherein said coding means codes said additional pattern as an odd parity bit for each stripe and wherein said calculating means also calculates the parity of the coded light signal received by each pixel and rejects those which do not have odd parity.

13. The apparatus of claim 10 wherein said projector includes means for repeating said series of patterns of stripes of light spatially side-by-side and wherein said coding means includes means for coding corresponding stripes in each repetition with the same code.

* * * * *